United States Patent
Nentwig

(10) Patent No.: US 8,145,151 B2
(45) Date of Patent: Mar. 27, 2012

(54) HYBRID SWITCHED MODE/LINEAR MODE POWER AMPLIFIER CONTROL

(75) Inventor: Markus Nentwig, Helsinki (FI)

(73) Assignee: Nokia Corporation, Espoo (FI)

( * ) Notice: Subject to any disclaimer, the term of this patent is extended or adjusted under 35 U.S.C. 154(b) by 1007 days.

(21) Appl. No.: 12/150,074

(22) Filed: Apr. 24, 2008

(65) Prior Publication Data

US 2009/0267581 A1 Oct. 29, 2009

(51) Int. Cl.
H04B 1/02 (2006.01)
(52) U.S. Cl. .................. 455/115.1; 455/127.1
(58) Field of Classification Search ............ 455/550.1, 455/572, 574, 115.1, 127.1, 127.2, 127.5; 330/10, 127
See application file for complete search history.

(56) References Cited

U.S. PATENT DOCUMENTS

| | | | | |
|---|---|---|---|---|
| 5,826,170 | A * | 10/1998 | Hirschfield et al. | 455/127.1 |
| 6,377,784 | B2 | 4/2002 | McCune | 455/108 |
| 7,038,536 | B2 * | 5/2006 | Cioffi et al. | 330/10 |
| 7,058,373 | B2 | 6/2006 | Grigore | 455/127.1 |
| 7,738,928 | B2 * | 6/2010 | Veselic | 455/127.1 |
| 2006/0178119 | A1 | 8/2006 | Jarvinen | 455/114.2 |
| 2007/0014382 | A1 | 1/2007 | Shakeshaft et al. | 375/297 |
| 2008/0076484 | A1 | 3/2008 | Veselic | 455/572 |

FOREIGN PATENT DOCUMENTS

WO WO-03021766 A2 3/2003

OTHER PUBLICATIONS

3GPP TS 36.300 V8.3.0 (Dec. 2007), Evolved Universal Terrestrial Radio Access (E-UTRA) and Evolved Universal Terrestrial Radio Access Network (E-UTRAN); Overall description; Stage 2 (Release 8), pp. 1-121.
3GPP TS 36.211 V8.2.0 (Mar. 2008), Technical Specification Group Radio Access Network; Evolved Universal Terrestrial Radio Access (E-UTRA); Physical Channels and Modulation (Release 8), pp. 1-67.

* cited by examiner

Primary Examiner — Thanh Le
(74) Attorney, Agent, or Firm — Harrington & Smith

(57) ABSTRACT

In one aspect of the exemplary embodiments of this invention a method includes determining, based at least in part on a number of resource blocks to be transmitted, where the resource blocks may be spectrally contiguous or spectrally non-contiguous, a ratio of power to be provided by a switched mode power supply to power to be provided by a linear mode power supply; controlling the switched mode power supply and the linear mode power supply in accordance with the determined ratio to supply a total amount of power and providing the total amount of power to a supply voltage input of a polar transmitter.

37 Claims, 7 Drawing Sheets

---

DETERMINING, BASED AT LEAST IN PART ON A NUMBER OF RESOURCE BLOCKS TO BE TRANSMITTED, WHERE THE RESOURCE BLOCKS MAY BE SPECTRALLY CONTIGUOUS OR SPECTRALLY NON-CONTIGUOUS, A RATIO OF POWER TO BE PROVIDED BY A SWITCHED MODE POWER SUPPLY TO POWER TO BE PROVIDED BY A LINEAR MODE POWER SUPPLY — 6A

CONTROLLING THE SWITCHED MODE POWER SUPPLY AND THE LINEAR MODE POWER SUPPLY IN ACCORDANCE WITH THE DETERMINED RATIO TO SUPPLY A TOTAL AMOUNT OF POWER — 6B

PROVIDING THE TOTAL AMOUNT OF POWER TO A SUPPLY VOLTAGE INPUT OF A POLAR TRANSMITTER — 6C

| CONFIGURATION | $N_{SC}^{RB}$ | $N_{symb}^{UL}$ |
|---|---|---|
| NORMAL CYCLIC PREFIX | 12 | 7 |
| EXTENDED CYCLIC PREFIX | 12 | 6 |

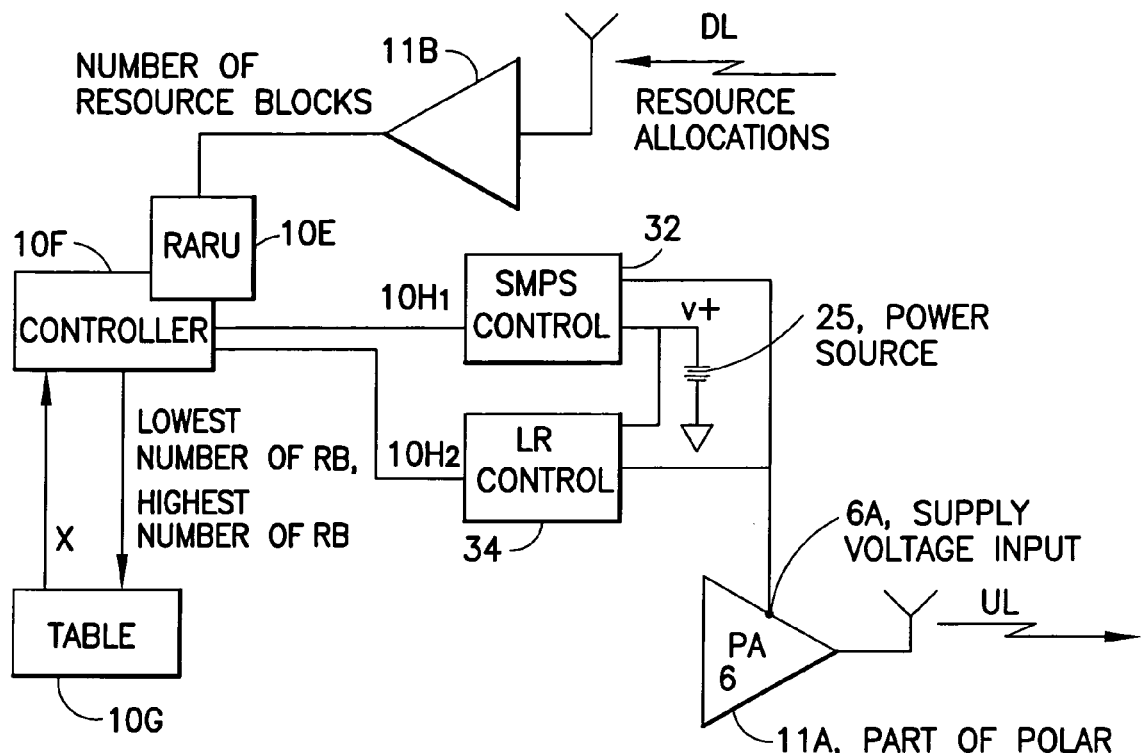

FIG.5C

| DETERMINING, BASED AT LEAST IN PART ON A NUMBER OF RESOURCE BLOCKS TO BE TRANSMITTED, WHERE THE RESOURCE BLOCKS MAY BE SPECTRALLY CONTIGUOUS OR SPECTRALLY NON-CONTIGUOUS, A RATIO OF POWER TO BE PROVIDED BY A SWITCHED MODE POWER SUPPLY TO POWER TO BE PROVIDED BY A LINEAR MODE POWER SUPPLY | 6A |

↓

| CONTROLLING THE SWITCHED MODE POWER SUPPLY AND THE LINEAR MODE POWER SUPPLY IN ACCORDANCE WITH THE DETERMINED RATIO TO SUPPLY A TOTAL AMOUNT OF POWER | 6B |

↓

| PROVIDING THE TOTAL AMOUNT OF POWER TO A SUPPLY VOLTAGE INPUT OF A POLAR TRANSMITTER | 6C |

FIG.6

HYBRID SWITCHED MODE/LINEAR MODE POWER AMPLIFIER CONTROL

TECHNICAL FIELD

The exemplary and non-limiting embodiments of this invention relate generally to wireless communication systems, methods, devices and computer programs and, more specifically, relate to providing operating power to a polar-type transmitter amplifier used in a communication apparatus.

BACKGROUND

Various abbreviations that may appear in the specification and/or in the drawing figures are defined as follows:
3GPP third generation partnership project
UTRAN universal terrestrial radio access network
EUTRAN evolved UTRAN (LTE)
LTE long term evolution
Node B base station
eNB EUTRAN Node B (evolved Node B)
UE user equipment
UL uplink (UE towards eNB)
DL downlink (eNB towards UE)
EPC evolved packet core
MME mobility management entity
S-GW serving gateway
MM mobility management
PHY physical
RLC radio link control
RRC radio resource control
RRM radio resource management
MAC medium access control
PDCP packet data convergence protocol
O&M operations and maintenance
BW bandwidth
FDMA frequency division multiple access
OFDMA orthogonal frequency division multiple access
SC-FDMA single carrier, frequency division multiple access
TTI transmission time interval
EDGE enhanced data rates for global evolution
SMPS switched mode power supply A proposed communication system known as evolved UTRAN (E-UTRAN, also referred to as UTRAN-LTE or as E-UTRA) is currently under development within the 3GPP. The current working assumption is that the DL access technique will be OFDMA, and the UL access technique will be SC-FDMA.

One specification of interest is 3GPP TS 36.300, V8.3.0 (2007-12), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8), incorporated by reference herein in its entirety.

FIG. 1 reproduces FIG. 4 of 3GPP TS 36.300, and shows the overall architecture of the E-UTRAN system. The E-UTRAN system includes eNBs, providing the E-UTRA user plane (PDCP/RLC/MAC/PHY) and control plane (RRC) protocol terminations towards the UE. The eNBs are interconnected with each other by means of an X2 interface. The eNBs are also connected by means of an S1 interface to an EPC, more specifically to a MME (Mobility Management Entity) by means of a S1-MME interface and to a Serving Gateway (S-GW) by means of a S1-U interface. The S1 interface supports a many-to-many relation between MMEs/Serving Gateways and eNBs.

The eNB hosts the following functions:
functions for Radio Resource Management: Radio Bearer Control, Radio Admission Control, Connection Mobility Control, allocation of resources to UEs in both uplink and downlink (scheduling);
IP header compression and encryption of user data stream;
selection of a MME at UE attachment;
routing of User Plane data towards Serving Gateway;
scheduling and transmission of paging messages (originated from the MME);
scheduling and transmission of broadcast information (originated from the MME or O&M); and
measurement and measurement reporting configuration for mobility and scheduling.

The LTE Layer 1 (PHY) is defined in such a way as to adapt to various spectrum allocations. In general, the PHY layer specification can be found in 3GPP TS 36.213, V8.2.0 (2008-03), 3rd Generation Partnership Project; Technical Specification Group Radio Access Network; Evolved Universal Terrestrial Radio Access (E-UTRA); Physical layer procedures (Release 8), and 3GPP TS 36.211, V8.2.0 (2008-03), 3rd Generation Partnership Project; Technical Specification Group Radio Access Network; Evolved Universal Terrestrial Radio Access (E-UTRA); Physical channels and modulation (Release 8).

Referring specifically to subclause 5.2 of 3GPP TS 36.211, V8.2.0, "Slot structure and physical resources", in subclause 5.2.1 a resource grid is shown and described. FIG. 5.2.1-1, reproduced herein as FIG. 2A, shows the UL resource grid as currently defined. The transmitted signal in each slot is described by the resource grid of $N_{RB}^{UL} N_{SC}^{RB}$ subcarriers and $N_{symb}^{UL}$ SC-FDMA symbols. The quantity $N_{RB}^{UL}$ depends on the uplink transmission bandwidth configured in the cell and fulfils the relationship:

$$N_{RB}^{min, UL} \leq N_{RB}^{UL} \leq N_{RB}^{max, UL},$$

where $N_{RB}^{min, UL}=6$ and $N_{RB}^{max, UL}=110$ is the smallest and largest UL BW, respectively, supported by the current version of the specification. The set of allowed values for $N_{RB}^{UL}$ is given by 3GPP TS 36.104, Evolved Universal Terrestrial Radio Access (E-UTRA); Base Station (BS) radio transmission and reception.

The number of SC-FDMA symbols in a slot depends on the cyclic prefix length configured by higher layers and is given in Table 5.2.3-1, reproduced herein as FIG. 2B.

As is described in subclause 5.2.2, "Resource elements", each element in the resource grid is referred to as a resource element and is uniquely defined by the index pair (k,l) in a slot where $k=0, \ldots, N_{RB}^{UL} N_{SC}^{RB}-1$ and $l=0, \ldots, N_{symb}^{UL}-1$ are the indices in the frequency domain and the time domain, respectively. Resource element (k,l) corresponds to the complex value $a_{k,l}$. Quantities $a_{k,l}$ corresponding to resource elements not used for transmission of a physical channel or a physical signal in a slot are set to zero.

Subclause 5.2.3, "Resource blocks", defines a physical resource block as $N_{symb}^{UL}$ consecutive SC-FDMA symbols in the time domain and $N_{SC}^{RB}$ consecutive subcarriers in the frequency domain, where $N_{symb}^{UL}$ and $N_{SC}^{RB}$ are given by Table 5.2.3-1 (FIG. 2B herein). A physical resource block in the UL thus consists of $N_{symb}^{UL} \times N_{SC}^{RB}$ resource elements, corresponding to one slot in the time domain and 180 kHz in the frequency domain.

Power amplifiers in mobile wireless devices consume a significant amount of the total energy contained in the battery, and their overall efficiency is a key design issue. To achieve good efficiency, polar transmitter architectures are being proposed and used. Typically, a polar transmitter includes a switched mode power supply (SMPS) that provides a time-varying supply voltage to the power amplifier with a bandwidth proportional to the modulation bandwidth of the RF signal.

One exemplary polar-type of transmitter arrangement is described in commonly owned US Patent Application Publication US 2006/0178119 A1, "Variable bandwidth envelope modulator for use with envelope elimination and restoration transmitter architecture and method" by Esko Jarvinen, incorporated by reference herein in its entirety. The envelope elimination and restoration (EER) transmitter architecture may be considered to represent a type of polar transmitter architecture.

The trend in future wireless systems is towards wider bandwidths, for example 20 MHz in LTE and up to (for example) 100 MHz for future extensions. In comparison, the design of a SMPS for use in transmitting a conventional WCDMA signal, having a 5 MHz BW, already presents a significant challenge.

One approach to achieve higher bandwidths for the modulated power amplifier supply voltage is the combination of a switched mode supply with a linear regulator. In this case the switched mode power supply achieves good efficiency at a low bandwidth while the linear regulator is capable of achieving a significantly higher bandwidth, but with a lower efficiency.

Commonly owned U.S. Pat. No. 7,058,373, "Hybrid switched mode/linear power amplifier power supply for use in polar transmitter" by Vlad G. Grigore (incorporated by reference herein in its entirety), discloses a linear regulator placed in parallel with a SMPS. This commonly owned US patent describes a DC-DC converter that has a switch mode part for coupling between a DC source and a load, where the switch mode part provides x amount of output power; and that further has a linear mode part coupled in parallel with the switch mode part between the DC source and the load, where the linear mode part provides y amount of output power. In this commonly owned US patent x is said to be preferably greater than y, and the ratio of x to y may be optimized for particular application constraints. In a further aspect of this commonly owned US patent there is described a radio frequency (RF) transmitter (TX) for coupling to an antenna, where the TX has a polar architecture having an amplitude modulation (AM) path coupled to a power supply of a power amplifier (PA) and a phase modulation (PM) path coupled to an input of the PA. The power supply includes the switch mode part for coupling between a battery and the PA and the linear mode part coupled in parallel with the switch mode part between the battery and the PA.

FIG. 3A herein reproduces FIG. 5, and FIG. 3B reproduces FIG. 13A of commonly owned U.S. Pat. No. 7,058,373.

The hybrid voltage regulator or power supply 30 shown in FIG. 3A combines a switching part 32, that processes preferably the majority of the power with high efficiency but low bandwidth, with a linear part 34 that preferably processes a smaller part of the required power with less efficiency but with high bandwidth. The result is a power supply that has the required bandwidth and efficiency somewhat lower than that of a purely switching power supply, but still significantly higher than that of the purely linear regulator. The resulting hybrid power supply 30 provides an improved output voltage quality to a power amplifier (PA) 6, as the linear part 34 can be used to compensate the output voltage ripple that is normally associated with a purely switching mode power supply. This is a significant benefit, as an excessive amount of output voltage ripple can adversely affect the output spectrum of the PA 6.

In principle the amount of power (x) that is processed by the switching part 32 is greater than the amount of power (y) processed by the linear part 34. This is generally a desirable situation and, in fact, in many embodiments x may be much greater than y. Generally it is desirable to maximize the ratio of x to the total power since the larger is this ratio, the higher is the efficiency. However, the actual ratio that is realized in a given application can be a function of one or more of the following factors and considerations (for example):

(a) the intended application (RF system specifics, such as the spectrum of RF envelope, amplitude of high frequency AC components, etc); and (b) the implementation, where one may decide to some extent how much power to process with the switching part 32 and how much with the linear part 34. For example, in the EDGE system one can process almost all of the power with the switching part 32 by using a 6-7 MHz switching frequency, or less power by using a slower switching converter operating at, e.g., 1 MHz. One may also in certain situations, e.g., at very low power, disable the switching part 32 and use only the linear part 34, in which case the relationship x>y does not apply at all.

In general the portion of the power x processed by the switching part 32 is preferably greater than the portion of the power y processed by the linear part 34, and also the ratio of x to y is preferably optimized for the constraints imposed by a given application, and possibly also by a particular mode of operation (e.g., in the low power mode mentioned above, where all power may be processed by the linear part 34). A combination may also be considered, such that x is preferably greater than y, and the ratio of x toy also may be optimized for the application constraints.

In practice, the embodiments described in the commonly owned U.S. Pat. No. 7,058,373 may be implemented by taking a portion of the topology of a switching converter (referred to in FIG. 3A as the "switching part") and paralleling it with a voltage or a current source (referred to in FIG. 3A as the "linear part").

As one non-limiting example of the numerous embodiments disclosed in commonly owned U.S. Pat. No. 7,058,373, FIG. 3B illustrates the source/sink behavior of a Voltage Controlled Voltage Source (VCVS) 34A, and models the behavior of the power amplifier. More specifically, FIG. 3B shows an embodiment with ideal sources, and where the voltage sources VCVS 34A and 34A' are uni-directional (one sources current, the other one sinks current), although in other embodiments they may be bidirectional.

Existing wireless systems are typically designed for a fixed bandwidth, or a small number of bandwidth modes. However, future wireless systems, such as the LTE system, may operate with a bandwidth that is essentially continuous over a wide range. A need exists to provide a wireless transmitter that is capable of efficient operation in a wireless system such as the LTE system.

SUMMARY

The foregoing and other problems are overcome, and other advantages are realized, by the use of the exemplary embodiments of this invention.

In a first aspect thereof the exemplary embodiments of this invention provide a method that includes determining, based at least in part on a number of resource blocks to be transmitted, where the resource blocks may be spectrally contiguous or spectrally non-contiguous, a ratio of power to be provided by a switched mode power supply to power to be provided by a linear mode power supply; controlling the switched mode power supply and the linear mode power supply in accordance with the determined ratio to supply a total amount of power; and providing the total amount of power to a supply voltage input of a polar transmitter.

In another aspect thereof the exemplary embodiments of this invention provide a memory medium that stores computer program instructions, where execution of the instructions results in performing operations that comprise: determining, based at least in part on a number of resource blocks to be transmitted, where the resource blocks may be spectrally contiguous or spectrally non-contiguous, a ratio of power to be provided by a switched mode power supply to power to be provided by a linear mode power supply; controlling the switched mode power supply and the linear mode power supply in accordance with the determined ratio to supply a total amount of power; and providing the total amount of power to a supply voltage input of a polar transmitter.

In another aspect thereof the exemplary embodiments of this invention provide an apparatus that includes a controller responsive at least in part to a number of resource blocks to be transmitted by a polar transmitter, where the resource blocks may be spectrally contiguous or spectrally non-contiguous, to establish a ratio of power provided by a switched mode power supply to power provided by a linear mode power supply, where the total power is provided to a modulated voltage input of a power amplifier.

In a further aspect thereof the exemplary embodiments of this invention provide an apparatus that comprises means for determining a ratio of power to be provided by a switched mode power supply to power to be provided by a linear mode power supply. The determining means comprises means for performing a table lookup procedure based on one of a total number of uplink resource blocks to be transmitted or on an identification of a resource block representing a lowest frequency subcarrier and an identification of a resource block representing a highest frequency subcarrier, where the resource blocks may be spectrally contiguous or spectrally non-contiguous. The apparatus further comprises means for controlling the switched mode power supply and the linear mode power supply in accordance with the determined ratio to supply a total amount of power, and for providing the total amount of power to the supply voltage input of the polar transmitter power amplifier. The switched mode power supply and the linear mode power supply may be coupled together in one of parallel or serial between a source of power and a supply voltage input of a power amplifier of a polar transmitter.

In a further aspect thereof the exemplary embodiments of this invention provide a method that includes, during a wireless connection comprising a plurality of transmission intervals, determining a ratio of power to be provided by a switched mode power supply to power to be provided by a linear mode power supply in order to accommodate a bandwidth needed for a next uplink transmission interval; controlling the switched mode power supply and the linear mode power supply in accordance with the determined ratio to supply a total amount of power and providing, during the next uplink transmission interval, the total amount of power to a supply voltage input of a polar transmitter.

Another aspect of the exemplary embodiments of this invention provides an apparatus that includes a controller configured, during a wireless connection comprised of a plurality of transmission intervals, to determine a ratio of power to be provided by a switched mode power supply to power to be provided by a linear mode power supply in order to accommodate a bandwidth needed for a next uplink transmission interval, said controller being further configured to control the switched mode power supply and the linear mode power supply in accordance with the determined ratio to supply a total amount of power, during the next uplink transmission interval, to a polar transmitter.

BRIEF DESCRIPTION OF THE DRAWINGS

In the attached Drawing Figures:

FIG. 3A is a block diagram of a power amplifier supplied by a hybrid voltage regulator comprised of a SMPS and linear mode voltage regulator.

FIG. 5C is a block diagram that shows in further detail the UE transmitter of FIG. 4, and the control circuitry associated therewith, in accordance with a second exemplary embodiment of this invention.

FIG. 6 is a logic flow diagram that illustrates the operation of a method, and a result of execution of computer program instructions, in accordance with the exemplary embodiments of this invention.

DETAILED DESCRIPTION

The exemplary embodiments of this invention provide a wireless transmitter that achieves good efficiency over a wide range of signal bandwidths. The exemplary embodiments of this invention exploit the fact that in the LTE system (the E-UTRAN system) the needed UL bandwidth is proportional to the number of resource blocks that are allocated to the UE for transmission on the UL.

Figures 1, 2B:
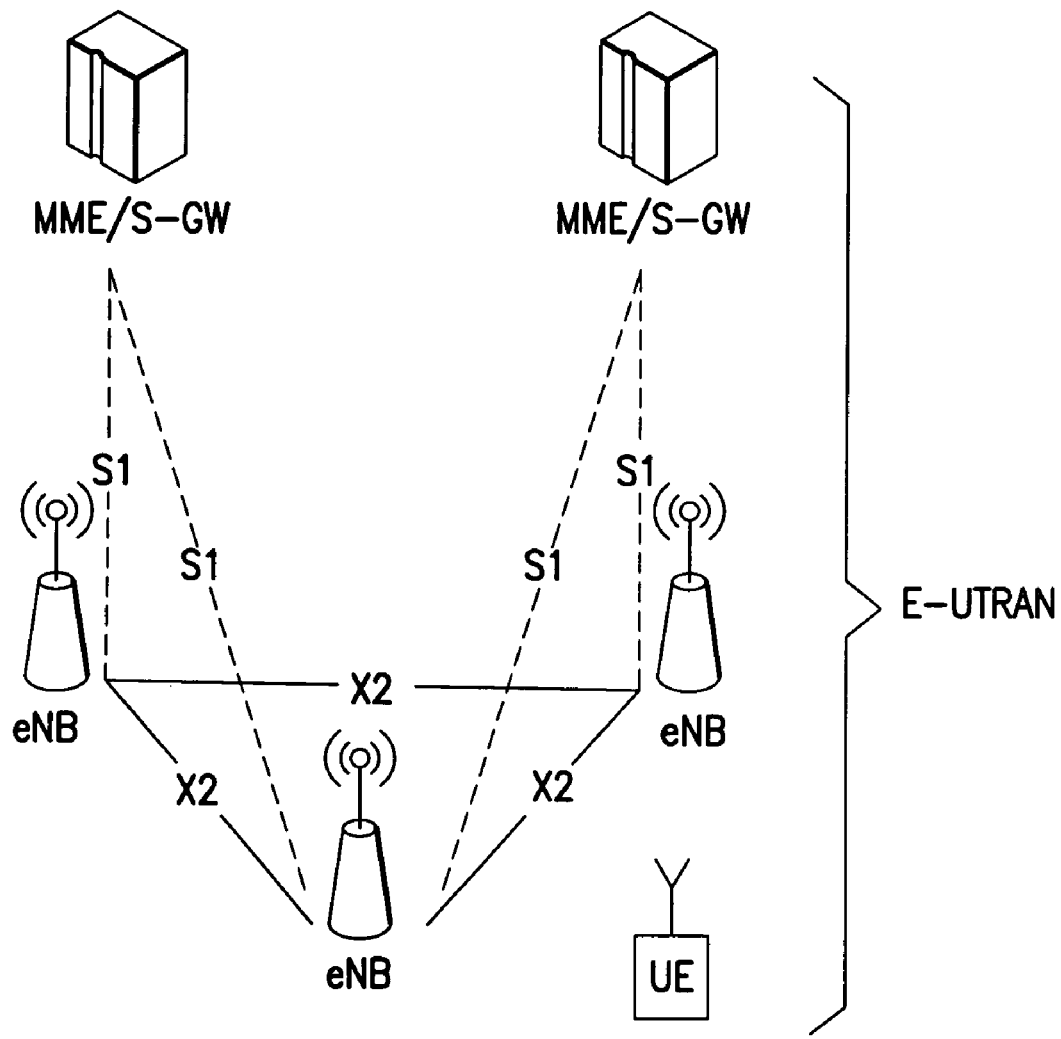
FIG. 1 reproduces FIG. 4 of 3GPP TS 36.300, and shows the overall architecture of the E-UTRAN system.
FIG. 2B reproduces Table 5.2.3-1 of 3GPP TS 36.211 and shows resource block parameters.
Figure 2A:
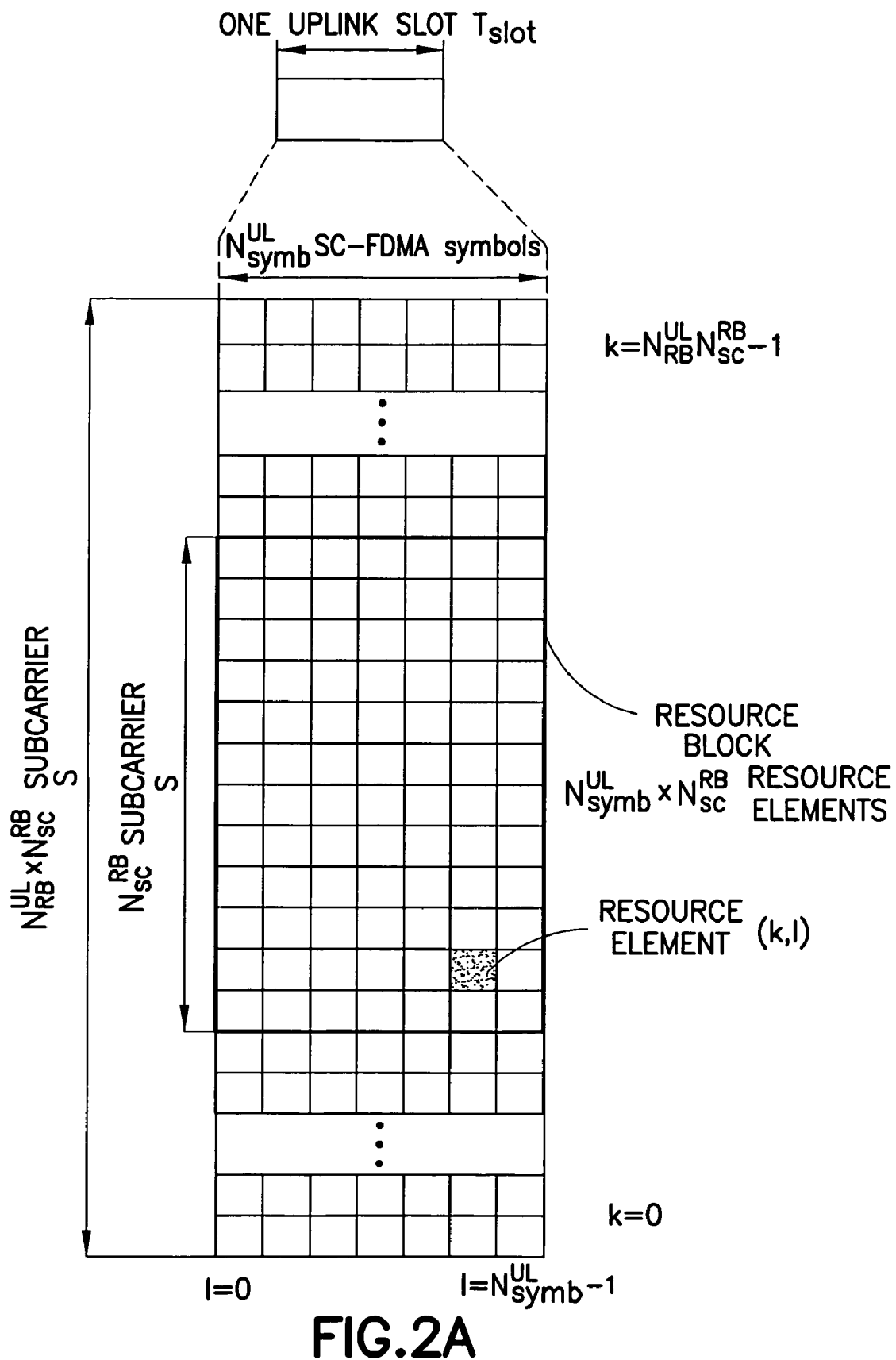
FIG. 2A reproduces FIG. 5.2.1-1 of 3GPP TS 36.211 and shows an UL resource grid

It should be noted at the outset that the following description will be made at least partially in the context of the resource blocks of LTE. However, the meaning of a resource block per se should not be construed to be limited to only the present definition given for LTE (e.g., see FIGS. 2A, 2B and the related description thereof), as this definition may evolve and change. Furthermore, the description of the exemplary embodiments of this invention should not be construed as being limited for use with only the LTE (E-UTRAN) system, which is considered herein as but one non-limiting example of a current or possible future wireless communication system wherein a transmitted waveform (e.g., a waveform transmitted with time domain and frequency domain components) is capable of exhibiting different bandwidth requirements during operation of the wireless communication system.

Figure 4:
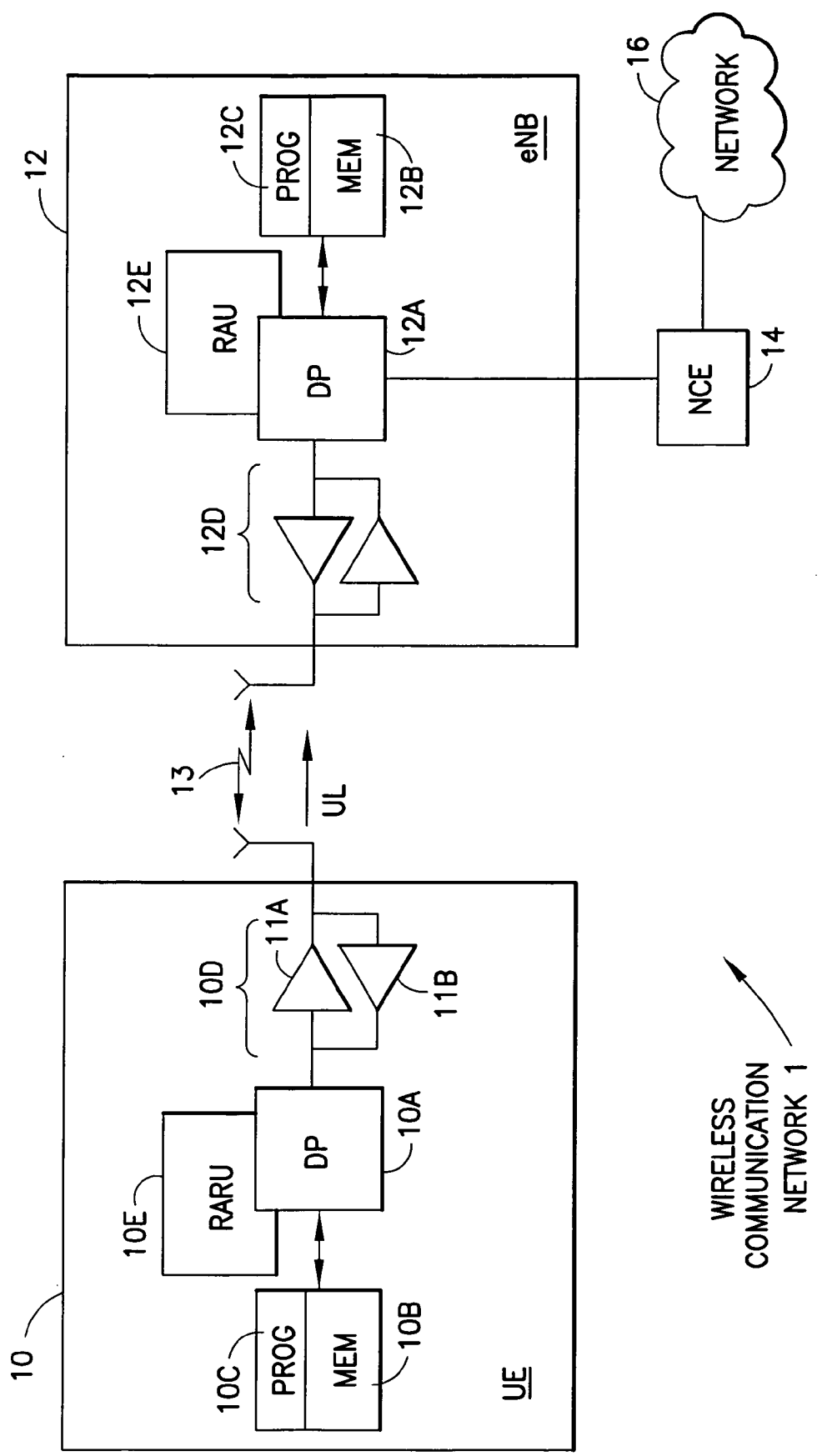
FIG. 4 shows a simplified block diagram of various electronic devices that are suitable for use in practicing the exemplary embodiments of this invention.

Reference is made to FIG. 4 for illustrating a simplified high-level block diagram of various electronic devices that are suitable for use in practicing the exemplary embodiments of this invention. In FIG. 4 a wireless communication network 1 is adapted for communication with an apparatus, such as a mobile communication device which may be referred to as a UE 10, via a network access node, such as a Node B or base station (BS), and more specifically an eNB 12. The network 1 may include a network control element (NCE) 14 that may include the MME/S-GW functionality shown in FIG. 1, and which provides connectivity with a network 16, such as a telephone network and/or a data communications network (e.g., the internet). The UE 10 includes a data processor (DP) 10A, a memory (MEM) 10B that stores a program (PROG) 10C, and a suitable radio frequency (RF) transceiver 10D having a transmitter 11A and a receiver 11B for conducting bidirectional wireless communications 13 with the eNB 12. The eNB 12 also includes a DP 12A, a MEM 12B that stores a PROG 12C, and a suitable RF transceiver 12D. The eNB 12 is coupled to the NCE 14 via a data path which may be implemented as the S1 interface shown in FIG. 1. At least the PROG 10C may include program instructions that, when executed by the associated DP 10A, enable the UE 10 to operate in accordance with the exemplary embodiments of this invention, as will be discussed below in greater detail. That is, the exemplary embodiments of this invention may be implemented at least in part by computer software executable by the DP 10A of the UE 10, or by hardware, or by a combination of software (and firmware) and hardware.

For the purposes of describing the exemplary embodiments of this invention the eNB 12 may be assumed to include a resource allocation unit (RAU) 12E, such as one that includes a frequency domain packet scheduler, that is capable of assigning UL resources to the UE 10 and signaling the resource allocations. A given resource allocation may be assumed to include a definition of one or more resource blocks (e.g., see FIGS. 2A, 2B). The UE 10 includes a resource allocation reception unit (RARU) 10E that receives and acts on the assigned resource allocations, as described below.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A, 12A may be of any type suitable to the local technical environment, and may include one or more of general purpose computers, special purpose computers, microprocessors, digital signal processors (DSPs) and processors based on a multicore processor architecture, as non-limiting examples.

Of particular interest herein is the transmitter 11A of the UE 10, and methods, apparatus and computer program(s) to control the operation of the transmitter 11A.

Figure 5A:
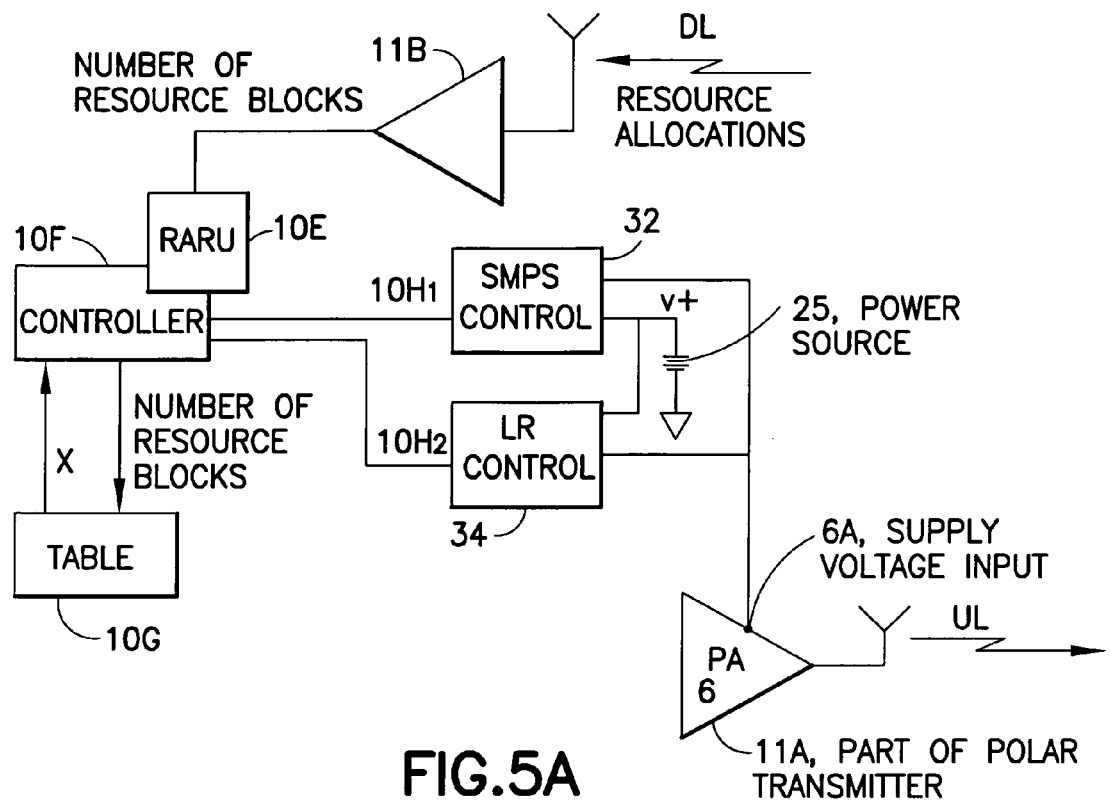
FIG. 5A is a block diagram that shows in further detail the UE transmitter of FIG. 4, and the control circuitry associated therewith, in accordance with a first exemplary embodiment of this invention.

Referring to FIG. 5A, the transmitter 11A is assumed to be a polar-type of radio transmitter having the power amplifier (PA) 6 with a power transistor that is supplied with power (a modulated supply voltage) at a supply voltage input 6A by a combination of a switched mode power supply (SMPS) 32 and a linear mode power supply, also referred to herein as a linear regulator (LR) 34. Power supplies 32 and 34 are each assumed to be connected with a same or different power source 25, such as a battery. A controller 10F, which is coupled with the RARU 10E to receive an indication of resource allocations there from, configures the ratio of power provided by the SMPS 32 and by the LR 34 to the PA 6 (the ratio of x to y, as described above with respect to the commonly owned U.S. Pat. No. 7,058,373) based on the known bandwidth of the transmitted signal. In accordance with the exemplary embodiments the known bandwidth may be determined at least in part in accordance with the number of UL resource blocks assigned to the UE 10 by the eNB 12.

The exemplary embodiments of this invention may employ a table 10G having entries that comprise the relative power allocated to the SMPS 32, x, and the relative power allocated to the LR 34, y, where y=1−x, and where each entry may be associated with a range of bandwidths required to be transmitted on the UL. In this manner the controller 10E may perform a table lookup operation to obtain the relative powers (x and y, or simply x if y is assumed to be equal to (1−x)), according to the bandwidth to be currently transmitted, and configures via control signals $10H_1$ and $10H_2$ the relative power contribution of the SMPS 32 and the LR 34, respectively. As non-limiting examples the control signal $10H_1$ may be used to set the pulse width modulation (PWM) duty cycle of the SMPS 32, while the control signal $10H_2$ may be used to set the drop across a series pass transistor of the LR 34. In each case the result is the setting of the output of the associated power supply to a desired level.

In accordance with first exemplary embodiments of this invention the needed bandwidth is determined by using the number of resource blocks allocated to the UE 10 for the next UL transmission. As such, the table 10G may be indexed by the controller 10F with the number of UL resource blocks obtained from the RARU 10E, and what is returned from the table 10G may be the corresponding value of the power ratio x (or both x and y if desired).

Note that in other embodiments at least the value of x may be determined algorithmically by the controller 10F based on at least one predetermined formula that uses as an input the number of resource blocks, thereby obviating the need to provide the table 10G.

It should be noted as well that the use of either embodiment (table-based or formula-based) does not preclude the use also of one or more factors to "tune" or adjust the values of x and y in accordance with one or more wireless system and/or UE 10 constraints or considerations. That is, and by example, the actual ratio of the contributions of the SMPS 32 and the LR 34 to the total modulated voltage signal applied to the PA 6 may be made to differ from the values of x and y determined by the table lookup procedure.

The controller 10F may be embodied as a hardware control unit that operates in accordance with a stored program, or it may be embodied as a state machine, or it may be embodied as part of the DP 10A of FIG. 4, or it may be embodied simply as one or more software routines executed by the DP 10A, as several non-limiting examples. The table 10G may be stored in the memory 10B of FIG. 4, or it might be resident in a register file or in some other suitable data storage medium implementation. The contents of the table 10G may be fixed and pre-stored when the UE 10 is first manufactured or provisioned and/or the contents may be set by system-level DL signaling information received from the eNB 12, and may thus also be changed if desired during operation of the wireless communication system 1.

Figure 3A:
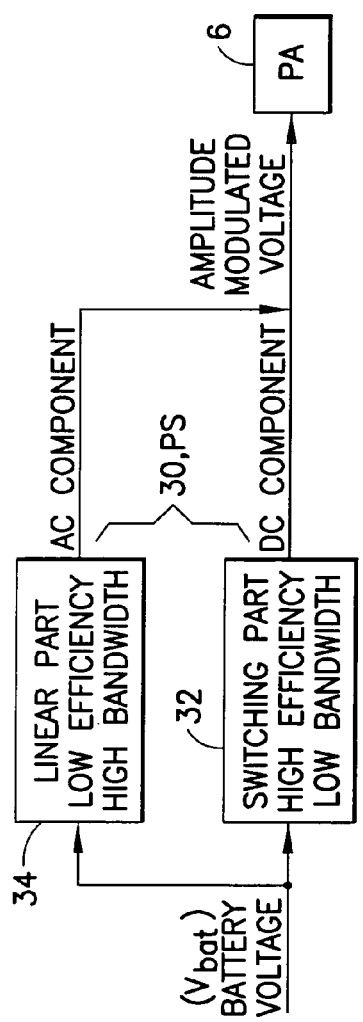
FIG. 3A reproduces FIG. 5, and FIG. 3B reproduces FIG. 13A, of commonly owned U.S. Pat. No. 7,058,373, where
Figure 3B:
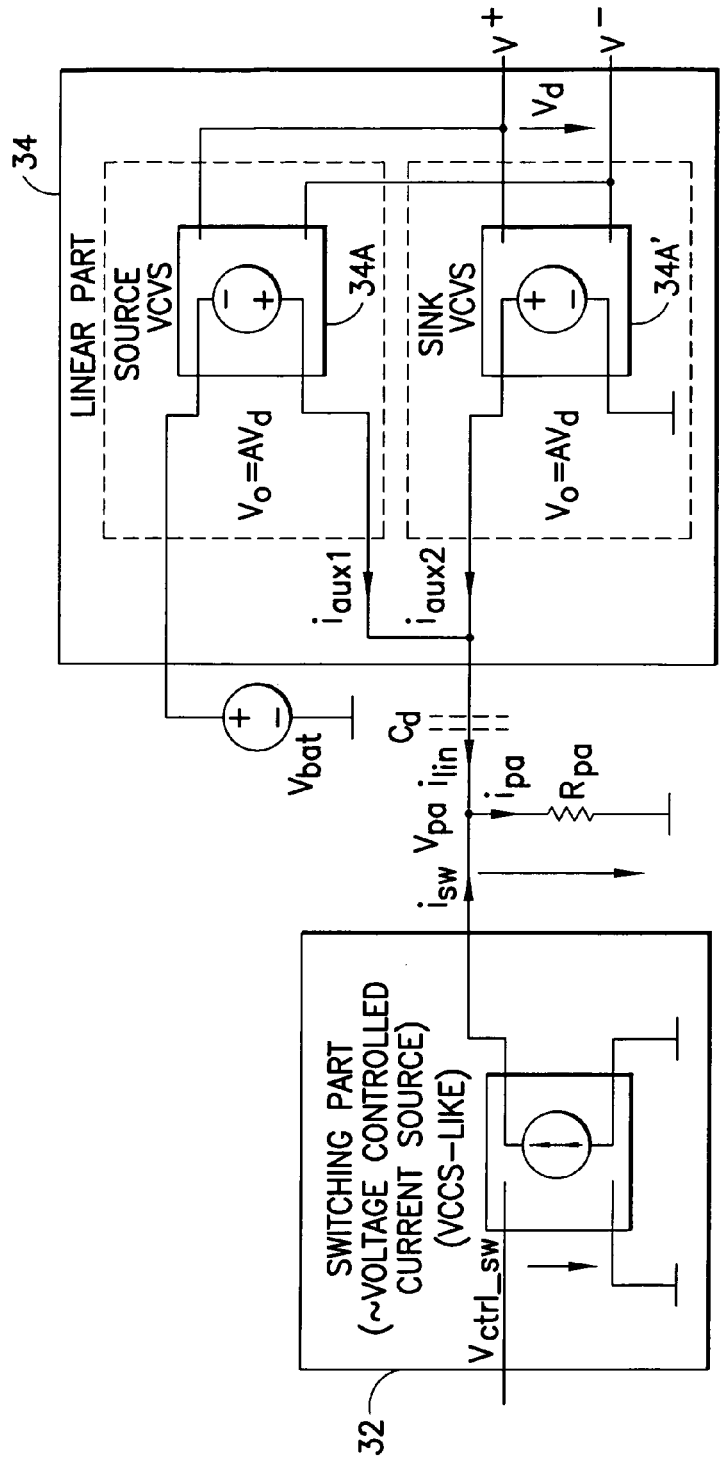
FIG. 3B shows a non-limiting example of a general circuit concept.

It should be noted that while the SMPS 32 and the LR 34 are shown in FIG. 5A as being coupled in a parallel relationship, in other embodiments of this invention they could be arranged in series. Reference in this regard may be made to, for example, FIG. 3 of U.S. Pat. No. 6,377,784, "High-Efficiency Modulation RF Amplifier" by Earl McCune.

Note further that the resource allocation may be given to the UE 10 dynamically, such as on a per TTI basis, or less frequently using, for example, a semi-persistent type allocation where a resource set is assigned to the UE 10 for use over two or more TTIs. In this latter case the particular values of x and y may remain in effect for a plurality of UL transmission intervals, if one assumes that the number of UL resource blocks is not changed between transmission intervals.

It is pointed out that the description thus far has been based on the use of the total number of resource blocks assigned to the UE 10. However, in a more general sense the overall signal bandwidth is of interest, rather than simply the number of resource blocks, such as when the radio system of interest does not use frequency domain processing and a subcarrier/resource block concept.

Further in this regard, when considering the concept of resource blocks, and in some certain instances, it is not simply the total number of resource blocks that may be of interest, but instead the overall bandwidth represented by the assigned resource blocks. For example, interest has been expressed during the LTE development process to use a so-called "discontinuous transmission" concept, where some number of resource blocks may be distributed over a wider spectrum, leaving spectral "gaps" between assigned resource blocks.

Figure 5B:
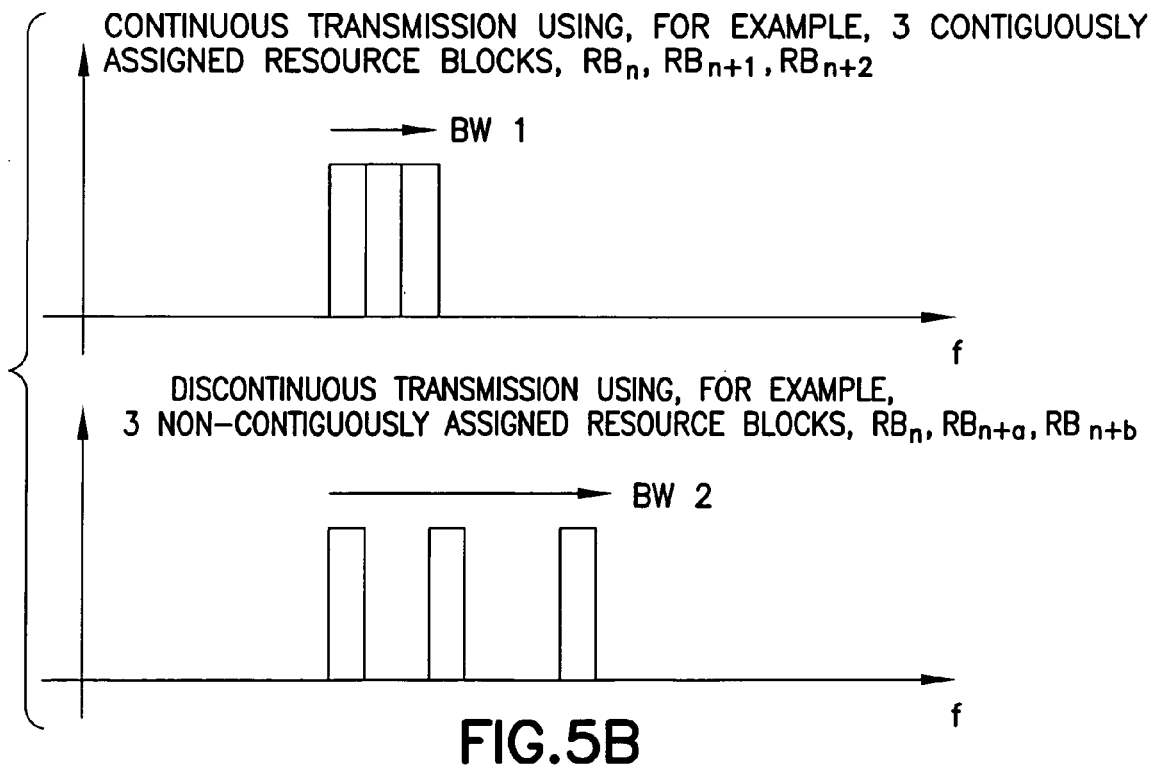
FIG. 5B graphically depicts the bandwidth encompassed by three contiguously assigned RBs versus three non-contiguously assigned RBs.

Reference in this regard can be made to FIG. 5B, where the top trace shows three contiguously assigned RBs ($RB_1$, $RB_2$, $RB_3$, or more generally $RB_n$, $RB_{n+1}$, $RB_{n+2}$), while the bottom trace shows three non-contiguously assigned RBs ($RB_n$, $RB_{n+a}$, $RB_{n+b}$, where one or both a and b is ≠1). As can be appreciated, the total transmit BW associated with the non-contiguously assigned RBs of the lower trace is greater (wider) than the total transmit BW associated with the contiguously assigned RBs of the upper trace. In general, the RBs shown in the top trace may be considered to be spectrally contiguous, while the RBs shown in the bottom trace may be considered to be spectrally non-contiguous. Note that in some embodiments two or more assigned RBs may be spectrally contiguous, while in the same assignment one or more other assigned RBs may not be spectrally contiguous with the other RBs.

In general, the bandwidth of the transmitted signal, which determines the envelope bandwidth and ultimately the BW requirement on the combination of the SMPS 32 and the linear mode supply 34 providing a modulated voltage to the PA 6, depends on the frequency difference between the two outermost subcarriers. For example, in FIG. 5B BW 2>>BW 1, even though the total number of resource blocks remains the same.

FIG. 5C depicts a further exemplary embodiment in accordance with this invention, where the circuitry shown in FIG. 5A is modified such that the table 10G is indexed by using the number (or more generally identification) of the lowest RB, representing the lowest frequency subcarrier, and by using the number (or more generally the identification) of the highest RB, representing the highest frequency subcarrier. In this case the value of x output from the table 10G reflects the total width of the transmission BW. In all other respects the circuitry shown in FIG. 5C can be identical to that described above for the embodiment of FIG. 5A.

Note that if it is known that the RBs are assigned in a spectrally contiguous manner to the UE 10 then the embodiment of FIG. 5A may be used, while if it is known that the RBs are assigned in a spectrally non-contiguous manner to the UE 10 then the embodiment of FIG. 5C may be used instead. Likewise, note that the embodiment of FIG. 5C may be used in all cases (contiguous or non-contiguous assignment of RBs). Note as well, and as was discussed above, in other embodiments at least the value of x may be determined algorithmically by the controller 10F based on at least one predetermined formula that uses as an input, in this case, the numbers (or identifications) of the lowest and highest frequency resource blocks, thereby obviating the need to provide the table 10G.

In all of these various cases and embodiments, and as a general rule, the linear mode power supply 34 will be operated to provide a higher output level as the required UL transmission BW increases, with the overall goal being to achieve the best power consumption efficiency (and hence to maximize the amount of time between required battery rechargings).

Based on the foregoing it should be apparent that the exemplary embodiments of this invention provide a method, apparatus and computer program product(s) to provide power to a polar transmitter from a combination of a SMPS and a linear regulator, where the relative contributions of the SMPS and the linear regulator to the provided power are established based at least in part on a number of resource blocks to be transmitted, where the resource blocks may be spectrally contiguous or spectrally non-contiguous.

Reference is made to FIG. 6 for showing a logic flow diagram that illustrates the operation of a method, and a result of execution of computer program instructions, in accordance with the exemplary embodiments of this invention. At Block 6A there is a step of determining, based at least in part on a number of resource blocks to be transmitted, where the resource blocks may be spectrally contiguous or spectrally non-contiguous, a ratio of power to be provided by a switched mode power supply to power to be provided by a linear mode power supply. At Block 6B there is a step of controlling the switched mode power supply and the linear mode power supply in accordance with the determined ratio to supply a total amount of power. At Block 6C there is a step of providing the total amount of power to a supply voltage input of a polar transmitter.

The method, and the result of the execution of computer program instructions of the preceding paragraph, wherein the step of determining is based on a spacing between a first resource block associated with a lowest transmission frequency, and a second resource block associated with a highest transmission frequency.

The method, and the result of the execution of computer program instructions of the preceding paragraphs, wherein a resource block comprises a plurality of resource elements, where each resource element defines one frequency subcarrier and one frequency division multiple access symbol.

The method, and the result of the execution of computer program instructions of the preceding paragraphs, wherein a resource block comprises a two-dimensional array of resource elements, where each resource element defines one frequency subcarrier and one frequency division multiple access symbol.

The method, and the result of the execution of computer program instructions of the preceding paragraphs, wherein determining the ratio comprises indexing a table using a total number of resource blocks and receiving from the table at least a value of x, where x represents the amount of power to be provided by the switched mode power supply and where 1−x represents the amount of power to be provided by the linear mode power supply.

The method, and the result of the execution of computer program instructions of the preceding paragraphs, wherein determining the ratio comprises indexing a table using an identification of a resource block representing a lowest frequency subcarrier and an identification of a resource block representing a highest frequency subcarrier, and receiving from the table at least a value of x, where x represents the amount of power to be provided by the switched mode power supply and where 1−x represents the amount of power to be provided by the linear mode power supply.

The method, and the result of the execution of computer program instructions of the preceding paragraphs, wherein determining the ratio comprises indexing a table using a total number of resource blocks, and receiving from the table a value of x and a value of y, where x represents the amount of power to be provided by the switched mode power supply, and where y represents the amount of power to be provided by the linear mode power supply.

The method, and the result of the execution of computer program instructions of the preceding paragraphs, wherein determining the ratio comprises indexing a table using an identification of a resource block representing a lowest frequency subcarrier and an identification of a resource block representing a highest frequency subcarrier, and receiving from the table a value of x and a value of y, where x represents the amount of power to be provided by the switched mode power supply, and where y represents the amount of power to be provided by the linear mode power supply.

The method, and the result of the execution of computer program instructions of the preceding paragraphs, wherein the switched mode power supply and the linear mode power supply are coupled together in parallel between a source of power and the supply voltage input of the polar transmitter, or are coupled together in series between the source of power and the supply voltage input of the polar transmitter.

It is noted that in some wireless communication systems, such as the LTE system, the uplink resources assigned to the UE 10 can change during a wireless connection, such as during a phone call or during a data transfer connection (including a VoIP (voice over internet protocol) connection). For example, in the LTE system it is possible to allocate uplink resources (e.g., number of resource blocks and/or identification of resource blocks) dynamically to the UE 10 so that they change periodically, possibly at every transmission interval. Alternatively, the uplink resources may be allocated in a semi-persistent manner wherein they can remain the same for some number of transmission intervals, and then be changed for some following one or more transmission intervals. As such, it should be appreciated that this type of operation can result in a transmission bandwidth requirement that is variable and that is capable of changing periodically during a wireless connection.

The use of these exemplary embodiments accommodates this type of operation, whereby the controller 10F has knowledge of a required transmit bandwidth during a next transmission interval, based at least on a resource block or resource blocks assigned to the UE 10 for the next transmission interval, and is thus enabled to change, if needed, the x/y ratio so as to provide the required uplink transmit bandwidth for the next transmission interval. As a result, the x/y ratio may be changed a plurality of times during a single connection (e.g., during a voice call or a data call).

Figure 7:
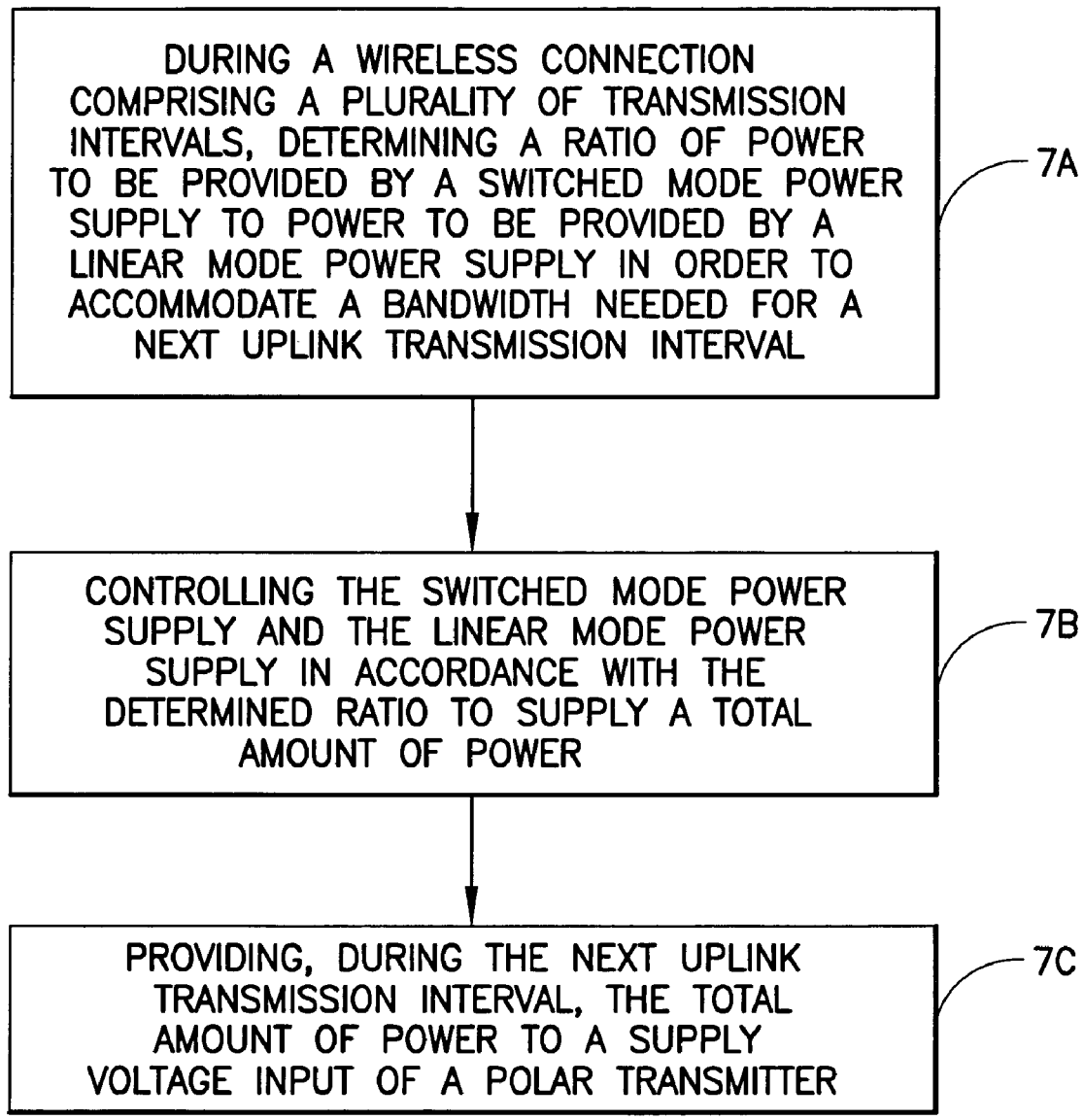
FIG. 7 is a logic flow diagram that illustrates the operation of a method, and a result of execution of computer program instructions, further in accordance with the exemplary embodiments of this invention.

Reference is made to FIG. 7 for showing a logic flow diagram that illustrates the operation of a method, and a result of execution of computer program instructions, further in accordance with the exemplary embodiments of this invention. At Block 7A there is a step of, during a wireless connection comprising a plurality of transmission intervals, determining a ratio of power to be provided by a switched mode power supply to power to be provided by a linear mode power supply in order to accommodate a bandwidth needed for a next uplink transmission interval. At Block 7B there is a step of controlling the switched mode power supply and the linear mode power supply in accordance with the determined ratio to supply a total amount of power. At Block 7C there is a step of providing, during the next uplink transmission interval, the total amount of power to a supply voltage input of a polar transmitter.

In the method, and as a result of the execution of computer program instructions of the preceding paragraph, where the operation of determining is based at least in part on a number of resource blocks to be transmitted, where the resource blocks may be spectrally contiguous or spectrally non-contiguous.

In the method, and as a result of the execution of computer program instructions of the preceding paragraphs, where the operations of determining, controlling and providing are repeated during the wireless connection to accommodate changes in the bandwidth needed for different ones of the uplink transmission intervals.

The various blocks shown in FIGS. 6 and 7 may be viewed as method steps, and/or as operations that result from operation of computer program code, and/or as a plurality of coupled logic circuit elements constructed to carry out the associated function(s).

Note then that the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the invention may be practiced in various components such as integrated circuit chips and modules. It should thus be further appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN (UTRAN LTE) system, it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
    determining, based at least in part on a number of resource blocks to be transmitted, where the resource blocks may be spectrally contiguous or spectrally non-contiguous, a ratio of power to be provided by a switched mode power supply to power to be provided by a linear mode power supply;
    controlling the switched mode power supply and the linear mode power supply in accordance with the determined ratio to supply a total amount of power; and
    providing the total amount of power to a supply voltage input of a polar transmitter.

2. The method of claim 1, where a resource block comprises a plurality of resource elements each defining one frequency subcarrier and one frequency division multiple access symbol.

3. The method of claim 1, where a resource block comprises a two-dimensional array of resource elements, each defining one frequency subcarrier and one frequency division multiple access symbol.

4. The method of claim 1, where determining the ratio comprises indexing a table using a total number of resource blocks, and receiving from the table at least a value of x, where x represents the amount of power to be provided by the switched mode power supply, and where 1−x represents the amount of power to be provided by the linear mode power supply.

5. The method of claim 1, where determining the ratio comprises indexing a table using an identification of a resource block representing a lowest frequency subcarrier and an identification of a resource block representing a highest frequency subcarrier, and receiving from the table at least a value of x, where x represents the amount of power to be provided by the switched mode power supply, and where 1−x represents the amount of power to be provided by the linear mode power supply.

6. The method of claim 1, where determining the ratio comprises indexing a table using a total number of resource blocks, and receiving from the table a value of x and a value of y, where x represents the amount of power to be provided by the switched mode power supply, and where y represents the amount of power to be provided by the linear mode power supply.

7. The method of claim 1, where determining the ratio comprises indexing a table using an identification of a resource block representing a lowest frequency subcarrier and an identification of a resource block representing a highest frequency subcarrier, and receiving from the table a value of x and a value of y, where x represents the amount of power to be provided by the switched mode power supply, and where y represents the amount of power to be provided by the linear mode power supply.

8. The method of claim 1, where the switched mode power supply and the linear mode power supply are coupled together in parallel between a source of power and the supply voltage input of the polar transmitter.

9. The method of claim 1, where the switched mode power supply and the linear mode power supply are coupled together in series between a source of power and the supply voltage input of the polar transmitter.

10. A non-transitory computer-readable medium that stores computer program instructions, where execution of the instructions results in performing operations that comprise:
    determining, based at least in part on a number of resource blocks to be transmitted, where the resource blocks may be spectrally contiguous or spectrally non-contiguous, a ratio of power to be provided by a switched mode power supply to power to be provided by a linear mode power supply;
    controlling the switched mode power supply and the linear mode power supply in accordance with the determined ratio to supply a total amount of power; and
    providing the total amount of power to a supply voltage input of a polar transmitter.

11. The non-transitory computer-readable medium of claim 10, where a resource block comprises a plurality of resource elements each defining one frequency subcarrier and one frequency division multiple access symbol.

12. The non-transitory computer-readable medium of claim 10, where a resource block comprises a two-dimensional array of resource elements, each defining one frequency subcarrier and one frequency division multiple access symbol.

13. The non-transitory computer-readable medium of claim 10, where determining the ratio comprises indexing a table using a total number of resource blocks, and receiving from the table at least a value of x, where x represents the amount of power to be provided by the switched mode power supply, and where 1−x represents the amount of power to be provided by the linear mode power supply.

14. The non-transitory computer-readable medium of claim 10, where determining the ratio comprises indexing a table using an identification of a resource block representing a lowest frequency subcarrier and an identification of a resource block representing a highest frequency subcarrier, and receiving from the table at least a value of x, where x represents the amount of power to be provided by the switched mode power supply, and where 1−x represents the amount of power to be provided by the linear mode power supply.

15. The non-transitory computer-readable medium of claim 10, where determining the ratio comprises indexing a table using a total number of resource blocks, and receiving from the table a value of x and a value of y, where x represents the amount of power to be provided by the switched mode power supply, and where y represents the amount of power to be provided by the linear mode power supply.

16. The non-transitory computer-readable medium of claim 10, where determining the ratio comprises indexing a table using an identification of a resource block representing a lowest frequency subcarrier and an identification of a resource block representing a highest frequency subcarrier, and receiving from the table a value of x and a value of y, where x represents the amount of power to be provided by the switched mode power supply, and where y represents the amount of power to be provided by the linear mode power supply.

17. The non-transitory computer-readable medium of claim 10, where the switched mode power supply and the linear mode power supply are coupled together in parallel between a source of power and the supply voltage input of the polar transmitter.

18. The non-transitory computer-readable medium of claim 10, where the switched mode power supply and the linear mode power supply are coupled together in series between a source of power and the supply voltage input of the polar transmitter.

19. An apparatus, comprising:
a controller, responsive at least in part to a number of resource blocks to be transmitted by a polar transmitter, where the resource blocks may be spectrally contiguous or spectrally non-contiguous, to establish a ratio of power provided by a switched mode power supply to power provided by a linear mode power supply, where the total power is provided to a modulated voltage input of a power amplifier.

20. The apparatus of claim 19, where a resource block comprises a plurality of resource elements each defining one frequency subcarrier and one frequency division multiple access symbol.

21. The apparatus of claim 19, where a resource block comprises a two-dimensional array of resource elements, each defining one frequency subcarrier and one frequency division multiple access symbol.

22. The apparatus of claim 19, where said controller is configurable to perform a table lookup, using a total number of resource blocks to be transmitted, to obtain at least a value of x, where x represents the amount of power provided by the switched mode power supply, and where 1−x represents the amount of power provided by the linear mode power supply.

23. The apparatus of claim 19, where said controller is configurable to perform a table lookup, using an identification of a resource block representing a lowest frequency subcarrier and an identification of a resource block representing a highest frequency subcarrier, to obtain at least a value of x, where x represents the amount of power provided by the switched mode power supply, and where 1−x represents the amount of power provided by the linear mode power supply.

24. The apparatus of claim 19, where said controller is configurable to perform a table lookup, using a total number of resource blocks, to obtain a value of x and a value of y, where x represents the amount of power provided by the switched mode power supply, and where y represents the amount of power provided by the linear mode power supply.

25. The apparatus of claim 19, where said controller is configurable to perform a table lookup, using an identification of a resource block representing a lowest frequency subcarrier and an identification of a resource block representing a highest frequency subcarrier, to obtain a value of x and a value of y, where x represents the amount of power provided by the switched mode power supply, and where y represents the amount of power provided by the linear mode power supply.

26. The apparatus of claim 19, where the switched mode power supply and the linear mode power supply are coupled together in parallel between a source of power and the modulated supply voltage input of the polar transmitter.

27. The apparatus of claim 19, where the switched mode power supply and the linear mode power supply are coupled together in series between a source of power and the modulated supply voltage input of the polar transmitter.

28. The apparatus of claim 19, embodied at least partially in an integrated circuit.

29. An apparatus, comprising:
means for determining a ratio of power to be provided by a switched mode power supply to power to be provided by a linear mode power supply, said determining means comprising means for performing a table lookup procedure based on one of a total number of uplink resource blocks to be transmitted or on an identification of a resource block representing a lowest frequency subcarrier and an identification of a resource block representing a highest frequency subcarrier, where the resource blocks may be spectrally contiguous or spectrally non-contiguous, where the switched mode power supply and the linear mode power supply are coupled together in one of parallel or serial between a source of power and a supply voltage input of a power amplifier of a polar transmitter; and
means for controlling the switched mode power supply and the linear mode power supply in accordance with the determined ratio to supply a total amount of power, and for providing the total amount of power to the supply voltage input of the polar transmitter power amplifier.

30. The apparatus of claim 29, where a resource block comprises a plurality of resource elements each defining one frequency subcarrier and one frequency division multiple access symbol.

31. The apparatus of claim 29, where the table lookup obtains at least a value of x, where x represents the amount of power to be provided by the switched mode power supply, and where 1−x represents the amount of power to be provided by the linear mode power supply.

32. A method, comprising:
during a wireless connection comprising a plurality of transmission intervals, determining a ratio of power to be provided by a switched mode power supply to power to be provided by a linear mode power supply in order to accommodate a bandwidth needed for a next uplink transmission interval;
controlling the switched mode power supply and the linear mode power supply in accordance with the determined ratio to supply a total amount of power; and
providing, during the next uplink transmission interval, the total amount of power to a supply voltage input of a polar transmitter.

33. The method of claim 32, where determining is based at least in part on a number of resource blocks to be transmitted, where the resource blocks may be spectrally contiguous or spectrally non-contiguous.

34. The method of claim 32, where the operations of determining, controlling and providing are repeated during the wireless connection to accommodate changes in the bandwidth needed for different ones of the uplink transmission intervals.

35. An apparatus, comprising:
a controller configured, during a wireless connection comprised of a plurality of transmission intervals, to determine a ratio of power to be provided by a switched mode power supply to power to be provided by a linear mode power supply in order to accommodate a bandwidth needed for a next uplink transmission interval, said controller being further configured to control the switched mode power supply and the linear mode power supply in accordance with the determined ratio to supply a total amount of power, during the next uplink transmission interval, to a polar transmitter.

36. The apparatus of claim 35, where said controller determines the ratio based at least in part on a number of resource blocks to be transmitted, where the resource blocks may be spectrally contiguous or spectrally non-contiguous.

37. The apparatus of claim 35, where said controller performs operations of determining the ratio and controlling the switched mode power supply and the linear mode power supply repeatedly during the wireless connection to accommodate changes in the bandwidth needed for different ones of the uplink transmission intervals.

* * * * *